Sept. 30, 1930.  H. E. S. HOLT  1,776,810
FLARE SUPPORTING BRACKET FOR AIRCRAFT
Filed March 28, 1929  2 Sheets-Sheet 1
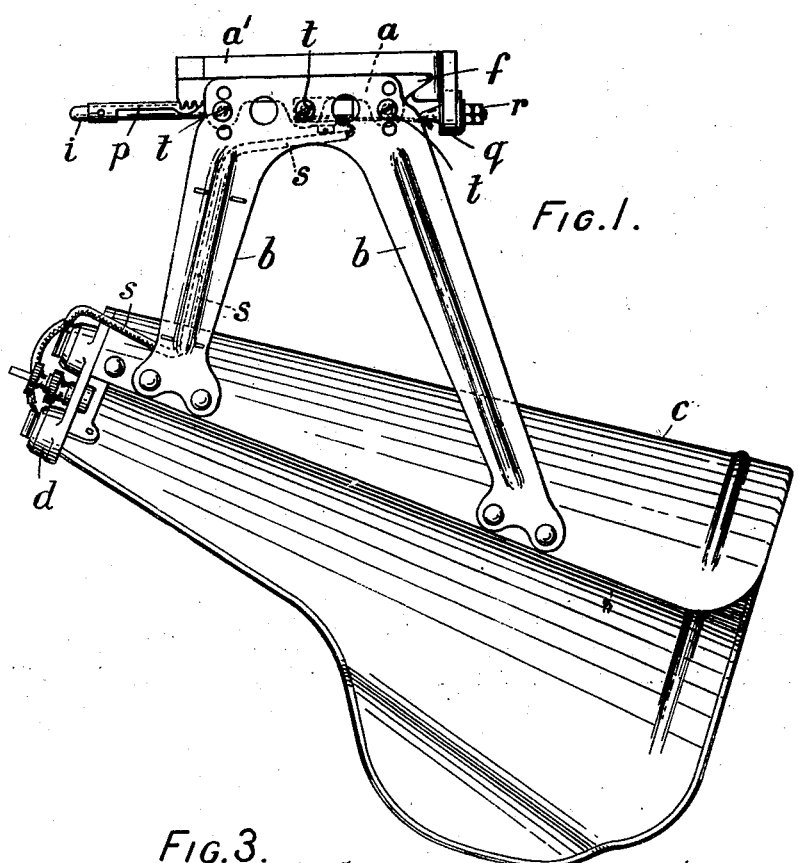
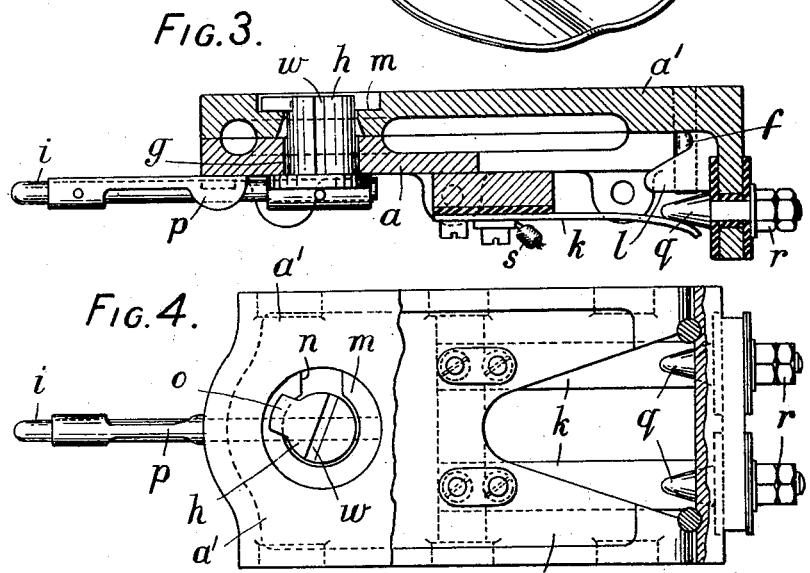
Harold E. S. Holt

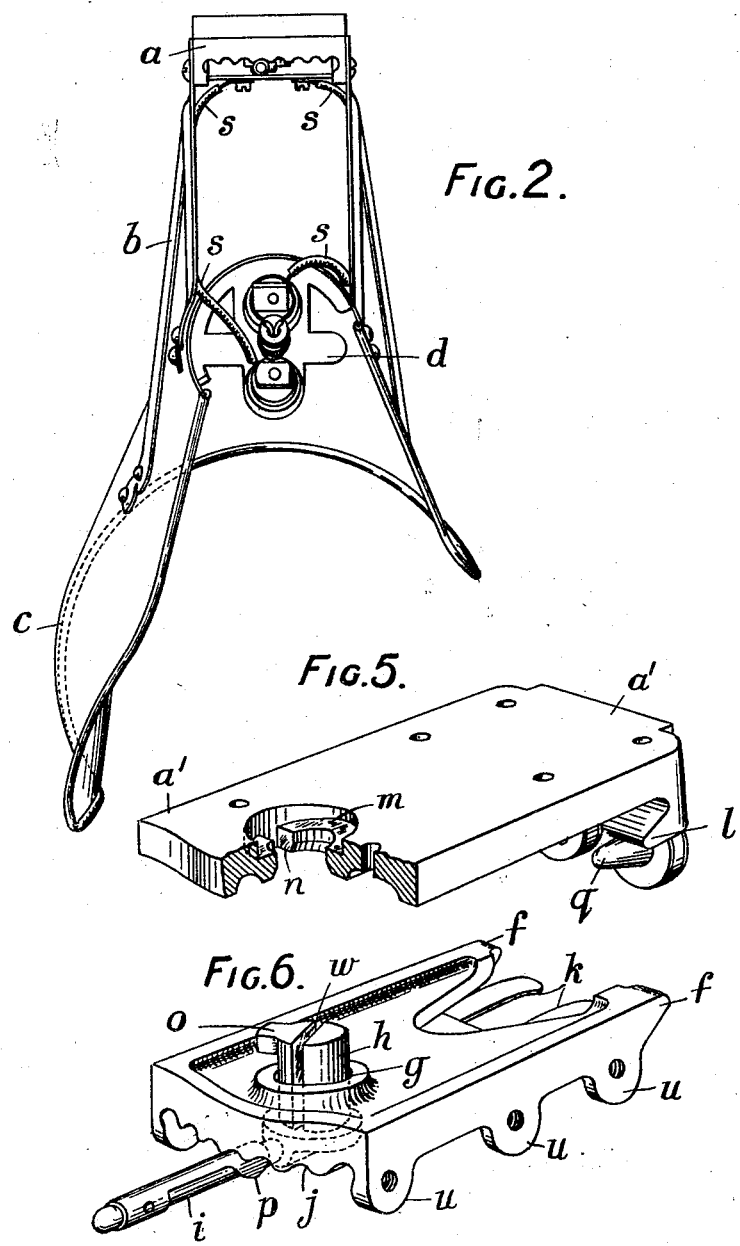

Patented Sept. 30, 1930

1,776,810

UNITED STATES PATENT OFFICE

HAROLD EDWARD SHERWIN HOLT, OF LONDON, ENGLAND

FLARE-SUPPORTING BRACKET FOR AIRCRAFT

Application filed March 28, 1929, Serial No. 350,768, and in Great Britain April 11, 1928.

This invention relates to the brackets employed for suspending flares and their shades under the wings of aircraft and has for its object to provide an improved construction of flare bracket and also a coupling head whereby the easy attachment and securing of the bracket to the wing or conversely the detachment and removal of the bracket shall be greatly facilitated.

The invention comprises a readily detachable portion or bracket proper provided with a top or head having means for effecting mechanical and electrical engagement with a coupling head which is permanently fixed on the aircraft and a quick locking and release member or catch arranged to secure the detachable bracket head to the fixed coupling head.

The invention also comprises other features of construction as hereafter described.

In the accompanying two sheets of illustrative drawings:—

Fig. 1 is a side elevation of a flare supporting bracket constructed according to this invention, the shade with flare holder being shown attached thereto, Fig. 2 is a front end elevation of the same, Fig. 3 is a vertical longitudinal section of the fixed and detachable coupling heads in coupled position drawn on a larger scale, Fig. 4 is a plan, a portion of the upper or fixed coupling head being supposedly removed, Fig. 5 is a perspective view of the fixed coupling head partly in section, and Fig. 6 is a perspective view of the detachable or bracket head.

As shown the bracket comprises a top or head $a$ with furcated depending limbs $b$ to the lower extremities of which the shade $c$ carrying the flare holder $d$ is attached.

At one end of the bracket head $a$ are beak like projections $f$ and near the opposite end is formed a circular aperture $g$ in which a rotary catch fastening $h$ is mounted. The fastening $h$ projects above the level of the top of the bracket head $a$ and is turned into the locking or release position by an arm or handle $i$ attached to its lower end and moving in close proximity to or in contact with a serrated surface $j$ on the underside of the bracket head. A pair of electrical contact blades $k$ are also mounted on but insulated from the underside of the bracket head.

A coupling head $a$ of substantially rectangular shape is formed with holes and intended to be permanently fixed by screws to the underside of the wing of the aircraft. At one end of the head $a'$ two lugs $l$ are formed having inclined upper faces for the engagement of the beak-like projections $f$ on the bracket head $a$ and at the opposite end of the head $a'$ is a countersunk eye or aperture $m$ into which the catch fastening $h$ in the bracket head $a$ is adapted to enter and to be secured by imparting a partial rotation thereto by operating the arm $i$. For this purpose the part surrounding the eye or aperture which is substantially circular in shape has a lateral recess $n$ through which a corresponding projection $o$ on the catch fastening $h$ can pass and then be moved out of alignment therewith to lock the parts together as will be understood, the bottom part of the aperture $m$ on which the projection $o$ slides, being appropriately inclined as shown in Fig. 5 to insure that the bracket head $a$ shall be drawn tightly against the coupling head $a^1$ by the rotation of the fastening $h$.

As shown the fastening $h$ is held in the coupling position by a spring catch $p$ on its operating arm or handle $i$ which engages the serrated surface $j$ aforementioned or the arm itself may be arranged to engage directly with the serrated surface, if it has sufficient resiliency.

A pair of tapered contacts $q$ located between but at a lower level than the lugs $l$ on the coupling head are arranged to make a good electrical connection with the contact blades $k$ on the bracket head $a$ when the coupling heads $a$, $a'$ are coupled together, so that current can pass from supply wires connected to terminals $r$ on the fixed coupling head through the contacts $q$ and contact blades $k$ to wires $s$ which are led along the furcated limbs to the flare terminals.

In the construction illustrated, the bracket head $a$ and coupling head $a'$ are conveniently made of light metal castings whilst the furcated limbs b of which there are four, are stamped in pairs from sheet metal and attached by screws t Fig. 1, or similar means to apertured lugs u Fig. 6, on the underside of the head. By a suitable arrangement of radial slots or of three holes v for each screw in the limb stampings, as shown, the limbs and consequently the angle of the flare can be adjusted in relation to the head.

The rotary catch fastening or coupling member h which is mounted to rotate in a circular aperture g in the bracket head as described is or may be slotted diametrically as shown at w to give sufficient resilience to the fastening to enable it to function notwithstanding the presence of sand or other foreign matter which may enter between the engaging parts of the coupling head.

I claim—

1. The combination with a detachable flare supporting bracket for aircraft, comprising a top or head with furcated depending limbs to the lower extremities of which the shade carrying the flare holder it attached, of a separate coupling head permanently fixed to the aircraft, and means for mechanically and electrically coupling the bracket head to the fixed coupling head including interengaging members, electrical contact members and a quick locking and release member or catch.

2. A detachable flare supporting bracket for aircraft according to claim 1, the mechanical connecting means comprising a rotary catch fastening mounted in the top or head of the bracket and adapted to enter an eye or aperture in the fixed coupling head and to be secured therein by imparting a partial rotation to the catch substantially as described.

3. The combination with a detachable flare supporting bracket for aircraft, comprising a top or head with furcated depending limbs to the lower extremities of which the shade carrying the flare holder is attached, and a separate coupling head permanently fixed to the aircraft, of means for mechanically and electrically coupling the bracket head to the fixed coupling head including interengaging lugs and projections on the bracket head and coupling head, electrical contact members and a quick locking and release member or catch, arranged, constructed and operating substantially as described.

4. A structure as specified in claim 3, wherein the limbs carrying the shade and flare holder are attached to the bracket head by removable fasteners passing through openings in said limbs in such manner that the angle of the flare can be adjusted with respect to the head.

In testimony whereof he has affixed his signature.

HAROLD EDWARD SHERWIN HOLT.